United States Patent
Ko (10) Patent No.: US 11,317,718 B2
(45) Date of Patent: May 3, 2022

(54) MOVABLE BEARING DEVICE

(71) Applicant: Wen-Shan Ko, Lugang Township (TW)

(72) Inventor: Wen-Shan Ko, Lugang Township (TW)

( * ) Notice: Subject to any disclaimer, the term of this patent is extended or adjusted under 35 U.S.C. 154(b) by 0 days.

(21) Appl. No.: 16/990,577

(22) Filed: Aug. 11, 2020

(65) Prior Publication Data

US 2022/0047077 A1    Feb. 17, 2022

(51) Int. Cl.
*A47B 91/00* (2006.01)
*A47B 91/02* (2006.01)
*B62B 5/00* (2006.01)

(52) U.S. Cl.
CPC .......... *A47B 91/024* (2013.01); *B62B 5/0093* (2013.01)

(58) Field of Classification Search
CPC ....... A47B 91/024; A47B 9/20; B62B 5/0093; B62B 5/0083; B62B 2202/30; B60B 33/0049; B60B 33/0002; B60B 33/0063; B60B 33/0039; B60B 33/06; F16M 11/22; Y10T 16/18; Y10T 16/184
USPC .................. 144/129, 285, 286.1, 286.5, 287; 414/462, 467, 495; 108/54.1, 144.11, 108/147, 147.19, 156; 312/351.1, 351.11, 312/249.8; 269/289 R; 16/35 R, 34, 45, 16/29, 32, 33; 248/188.9, 188.8; 280/79.11, 79.3
See application file for complete search history.

(56) References Cited

U.S. PATENT DOCUMENTS

| | | | | | |
|---|---|---|---|---|---|
| 2,964,327 | A | * | 12/1960 | Mohr | B25H 1/04 |
| | | | | | 280/43.24 |
| 2,990,171 | A | * | 6/1961 | Grove | B23Q 3/00 |
| | | | | | 269/59 |
| 3,534,430 | A | * | 10/1970 | Livesay | B60B 33/06 |
| | | | | | 16/34 |
| 5,331,717 | A | * | 7/1994 | Joslin | B60B 33/028 |
| | | | | | 16/35 R |
| 6,055,704 | A | * | 5/2000 | Leibman | B60B 33/06 |
| | | | | | 16/32 |
| 6,371,496 | B1 | * | 4/2002 | Balolia | B60T 1/14 |
| | | | | | 188/19 |
| 6,929,270 | B1 | * | 8/2005 | Flagstad | D06F 39/12 |
| | | | | | 280/79.11 |

(Continued)

FOREIGN PATENT DOCUMENTS

| CN | 108391993 | * | 8/2018 |
|---|---|---|---|
| CN | 110260123 | * | 9/2019 |

(Continued)

*Primary Examiner* — Janet M Wilkens
(74) *Attorney, Agent, or Firm* — Muncy, Geissler, Olds & Lowe, P.C.

(57) ABSTRACT

A movable bearing device includes a base, a plurality of casters, and a plurality of foot pads. The casters are provided on the bottom of the base. The foot pads are movably connected to the bottom of the base in a way that the foot pads are moved upwards and downwards with respect to the base. When the foot pads are moved downwards until their bottom surfaces each have a height equal to or lower than the bottom edges of the casters, the movable bearing device is supported on the ground by means of the foot pads, such that the movable bearing device cannot be moved. When the foot pads are moved upwards until their bottom surfaces each have a height higher than the bottom edges of the casters, the movable bearing device can be moved by means of the casters so as to facilitate the handling work.

6 Claims, 9 Drawing Sheets

(56) References Cited

U.S. PATENT DOCUMENTS

| | | | | |
|---|---|---|---|---|
| 7,163,214 B1* | 1/2007 | Bratton, Sr. | ............ | A63D 15/00 |
| | | | | 280/79.11 |
| 8,657,309 B2* | 2/2014 | Taylor | ................. | B60B 33/0021 |
| | | | | 280/47.32 |
| 10,427,701 B1* | 10/2019 | Brede | .................... | B62B 5/049 |
| 10,814,897 B2* | 10/2020 | Choueifati | ............. | B62B 3/008 |
| 2001/0042286 A1* | 11/2001 | Henriott | .............. | B60B 33/0042 |
| | | | | 16/29 |
| 2006/0082088 A1* | 4/2006 | Webster | ................. | B62B 5/049 |
| | | | | 280/79.11 |
| 2009/0212479 A1* | 8/2009 | Yu | ....................... | B23Q 1/0054 |
| | | | | 269/309 |
| 2009/0230647 A1* | 9/2009 | Taguchi | ................ | B62B 5/0083 |
| | | | | 280/79.3 |
| 2010/0129186 A1* | 5/2010 | Foote | .................... | B62B 5/0083 |
| | | | | 414/495 |
| 2010/0231103 A1* | 9/2010 | Sip | ....................... | H05K 5/0234 |
| | | | | 312/249.8 |
| 2010/0244640 A1* | 9/2010 | Yantis | ................. | A47B 91/022 |
| | | | | 312/249.8 |
| 2011/0073725 A1* | 3/2011 | Aoyama | ............ | B60B 33/0018 |
| | | | | 248/188.8 |

FOREIGN PATENT DOCUMENTS

| | | | |
|---|---|---|---|
| CN | 112135032 | * | 12/2020 |
| CN | 112161166 | * | 1/2021 |
| DE | 4307116 | * | 7/1996 |
| EP | 1637352 | * | 3/2006 |

* cited by examiner

MOVABLE BEARING DEVICE

BACKGROUND OF THE INVENTION

1. Field of the Invention

The present invention relates to bearing devices and more particularly, to a movable bearing device.

2. Description of the Related Art

With the continuous development of social economy, people are faced with a multitude of pressures and responsibilities in life, so they need an entertainment activity that can relax and relieve the pressure, such as singing in KTV. Many people choose to sing in a karaoke box, but the traditional karaoke box has its limitations in terms of the number of people, usage time and venue size, and it is difficult to meet the needs of all consumers. Compared with the traditional karaoke box, later there was a mini karaoke booth that looked like a telephone booth, which allows a single person or a few people to sing to their heart's content. Not only did the consumption threshold be low, but it is not limited by the number of people and usage time, so it is quite popular among consumers.

The aforementioned mini karaoke booth is usually installed in commercial districts, department stores or movie theaters, and may need to be adjusted in accordance with the planning of the indoor space after a period of time. However, because the aforementioned mini karaoke booth is placed directly on the ground and constructed with a certain weight, it is necessary to move it by using suitable handling equipment. Therefore, the aforementioned mini karaoke booth lacks in flexibility.

SUMMARY OF THE INVENTION

It is a primary objective of the present invention to provide a movable bearing device, which has good support effect and is easy to move, thereby enhancing flexibility in use.

To attain the above primary objective, the bearing device of the present invention includes a base, a plurality of casters, and a plurality of foot pads. The casters are attached to the bottom of the base and protruded from the bottom of the base. The foot pads are movably connected to the base in a way that the foot pads are movable relative to the base between a first position and a second position. When the foot pads are located at the first position, the bottom surfaces of the foot pads each have a height not higher than the bottom edges of the casters. When the foot pads are located at the second position, the bottom surfaces of the foot pads each have a height higher than the bottom edges of the casters.

Through the above-described configuration design, the bearing device of the present invention can be adjusted to two different usage modes according to actual needs. When the foot pads are operated to the first position, the bearing device is supported on the ground by means of the foot pads, such that the bearing device cannot be moved. When the foot pads are operated to the second position, the bearing device can be moved by means of the casters so as to facilitate the handling work.

Preferably, the base includes a support frame having a plurality of threaded holes, and a top plate disposed on the top surface of the support frame and having a plurality of top holes. The foot pads each have a pad body and a screw provided with a bottom end thereof connected with the pad body. The screw of each of the foot pads is inserted into one of the top holes of the top plate and screwed to one of the threaded holes of the support frame, such that the foot pads can be moved upwards and downwards between the first position and the second position. When the foot pads are located at the first position, the top ends of the screws are not protruded from the top holes and the bottom surfaces of the pad bodies each have a height not higher than the bottom edges of the casters. When the foot pads are located at the second position, the top ends of the screws are protruded from the top holes and the bottom surfaces of the pad bodies each have a height higher than the bottom edges of the casters.

Preferably, the base includes a bottom plate mounted to the bottom surface of the support frame and provided with a plurality of bottom holes and a plurality of openings. The screw of each of the foot pads passes through one respective bottom hole, and each of the casters is received in one respective opening.

Preferably, the support frame includes a frame body, a plurality of rib portions connected with the inner periphery of the frame body, a plurality of caster supporting portions fixedly connected between the inner periphery of the frame body and one of the rib portions, and a plurality of pad supporting portions. Each of the casters is attached to one respective caster supporting portion, and each of the threaded holes is formed in one respective pad supporting portion.

Preferably, the caster supporting portions each have two opposite lateral walls. Each of the casters is rotatably sleeved on a shaft provided with two ends thereof respectively inserted into two shaft holes each formed in one of the two lateral walls of one respective caster supporting portion. Two retaining rings are respectively fastened to two annular grooves each formed in one of the two ends of the shaft for preventing the shaft from being disengaged from one respective caster supporting portion, thereby completing the assembly of the caster.

Preferably, the casters each have a plurality of through holes passing through two opposite end surfaces thereof and arranged in an equally spaced manner around the center thereof.

Preferably, the casters are moved only in a straight line.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

First of all, it is to be mentioned that throughout the specification, including the embodiments described below and the claims, the nouns relating to directionality are based on the directions in the figures. Besides, same reference numerals used in the following preferred embodiments and the appendix drawings designate same or similar elements or the structural features thereof.

Figure 1:
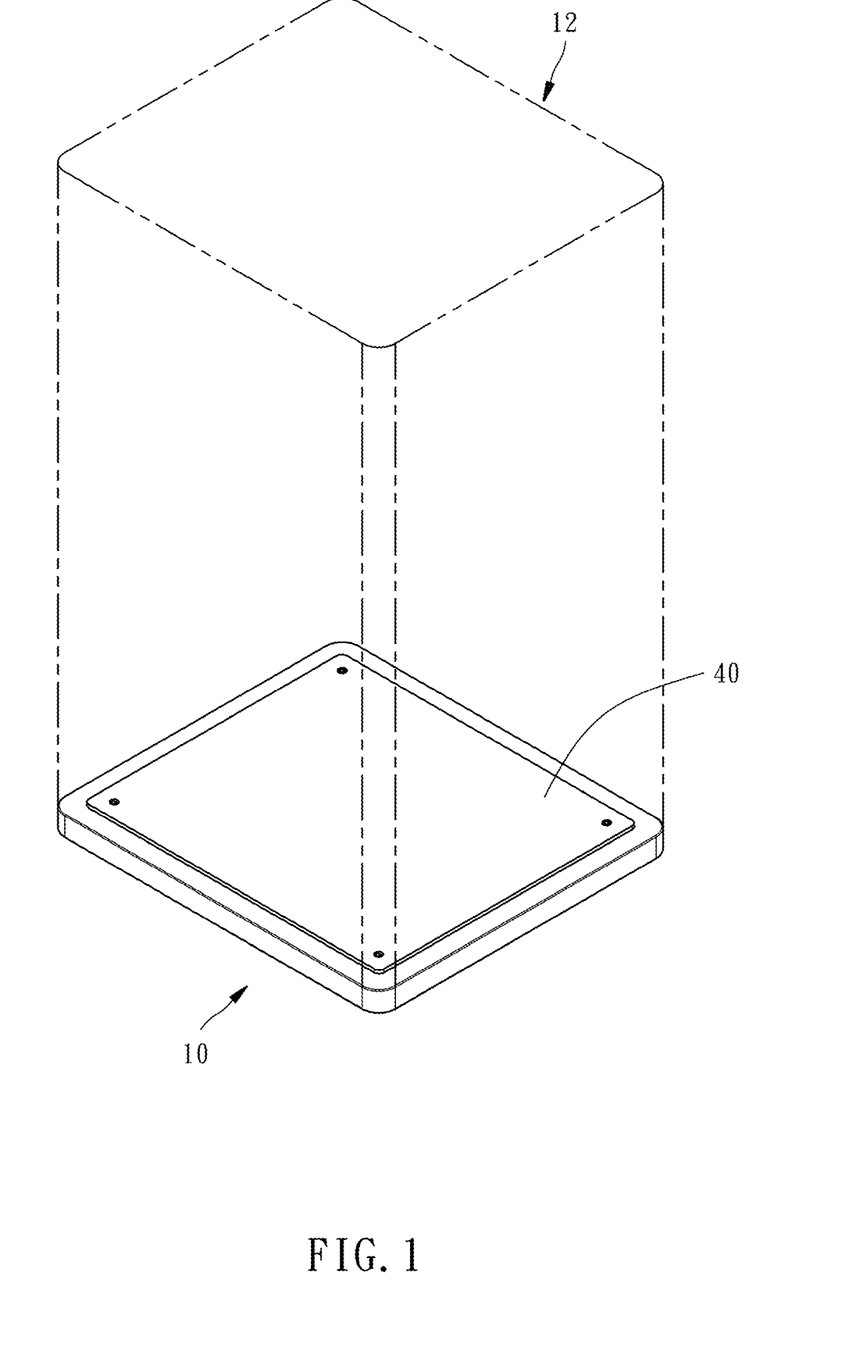
FIG. 1 is a perspective view of a booth using the bearing device of the present invention.
Figure 2:
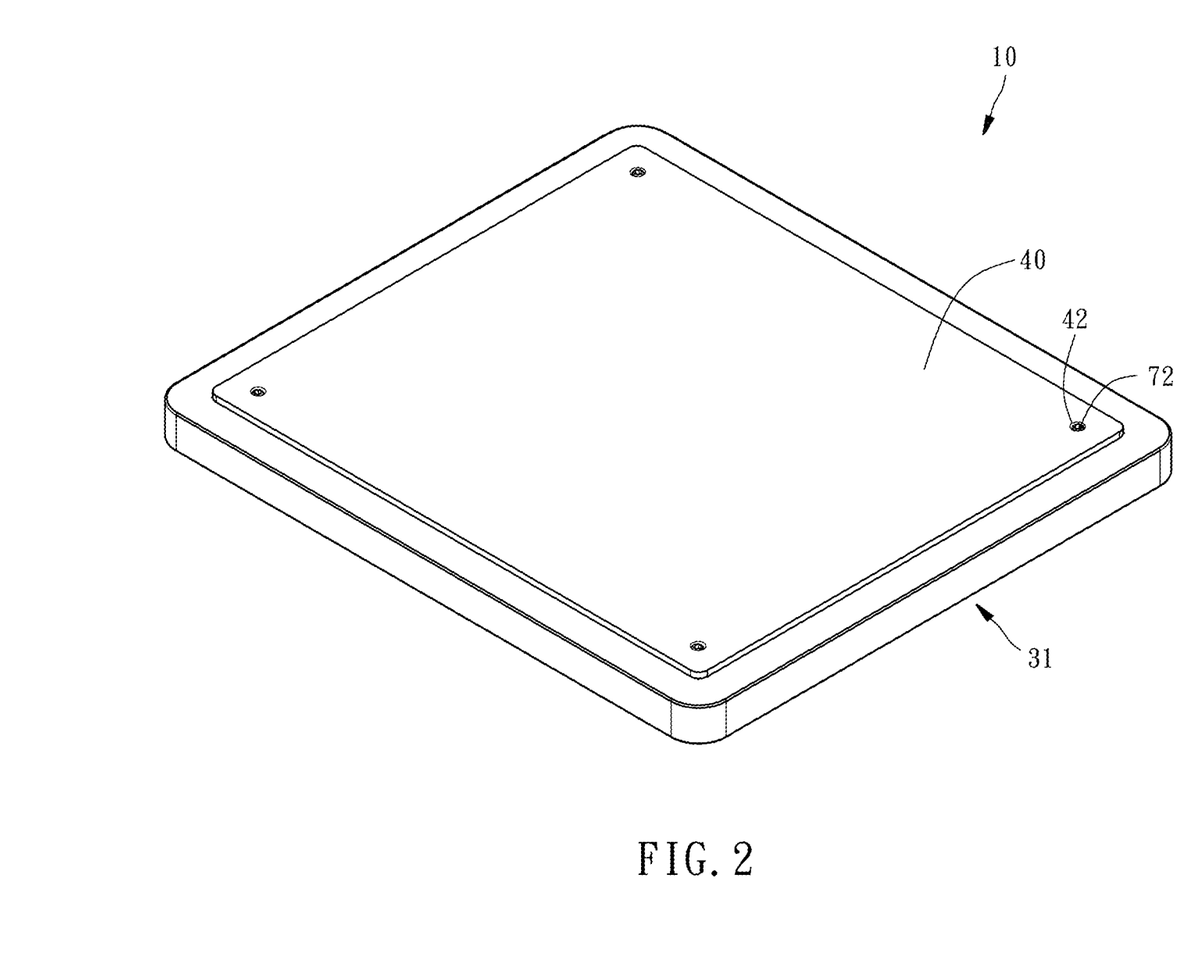
FIG. 2 is a top perspective view of the bearing device of the present invention.
Figure 3:
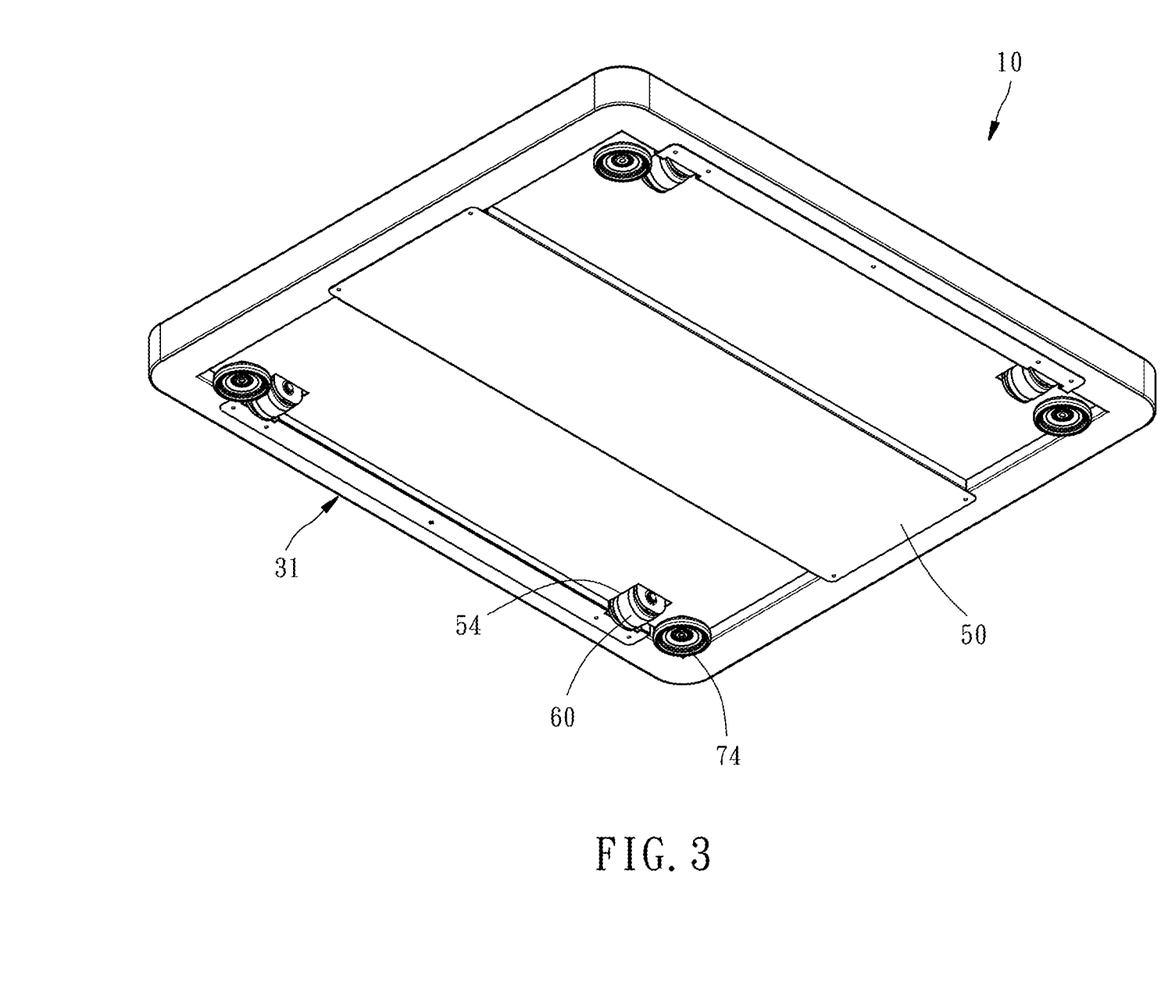
FIG. 3 is a bottom perspective view of the bearing device of the present invention.
Figure 4:
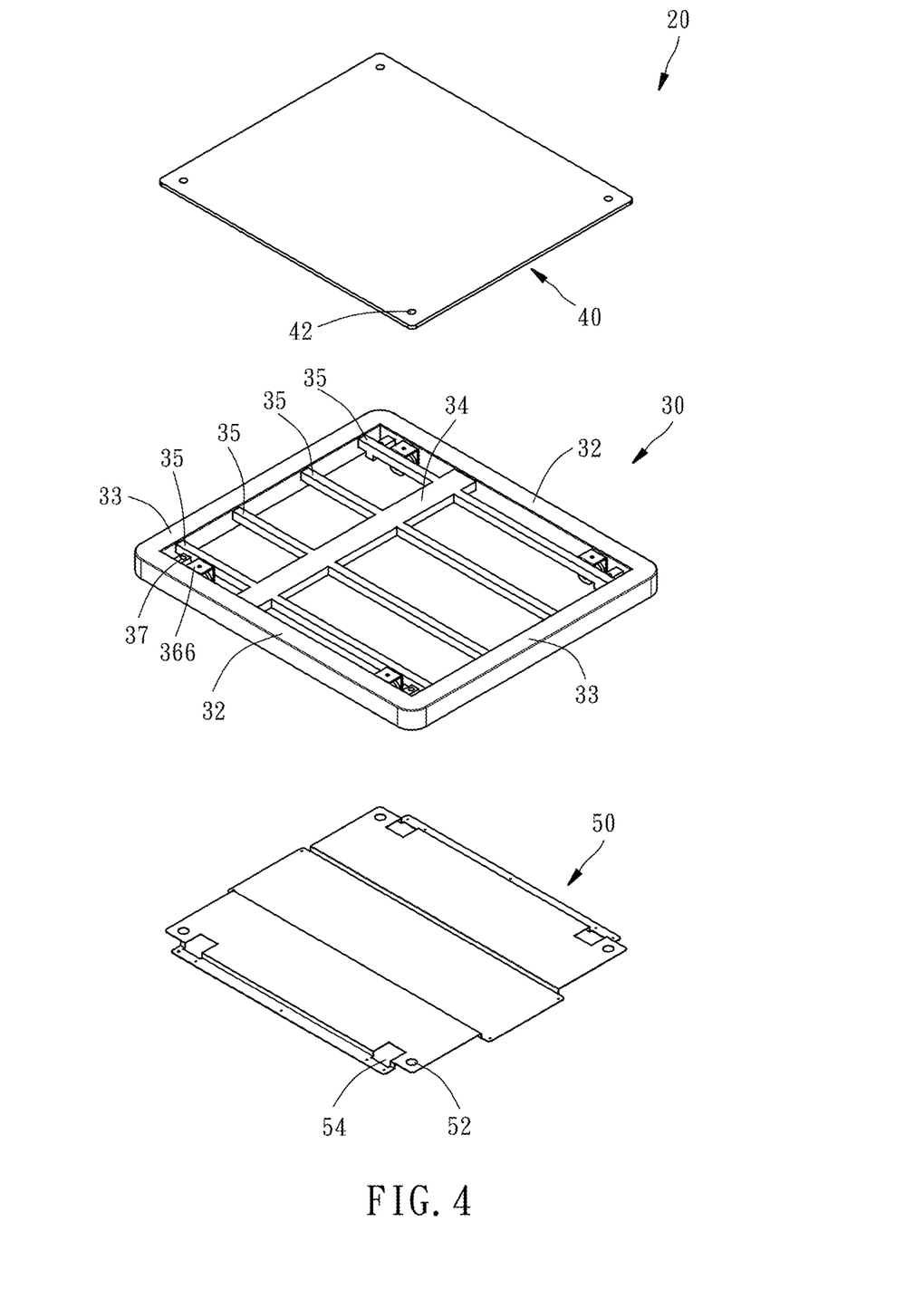
FIG. 4 is an exploded perspective view of the base of the bearing device of the present invention.

Referring to FIG. 1, the bearing device 10 of the present invention is adapted for a box 12, such as mini karaoke booth, that accommodate a single person or a few people to carry the weight of the human body and related audio-visual equipment. Referring to FIGS. 2 to 4, the bearing device 10 of the present invention comprises a base 20, a plurality of casters 60 (take four as an example), and a plurality of foot pads 70 (take four as an example).

Figure 6:
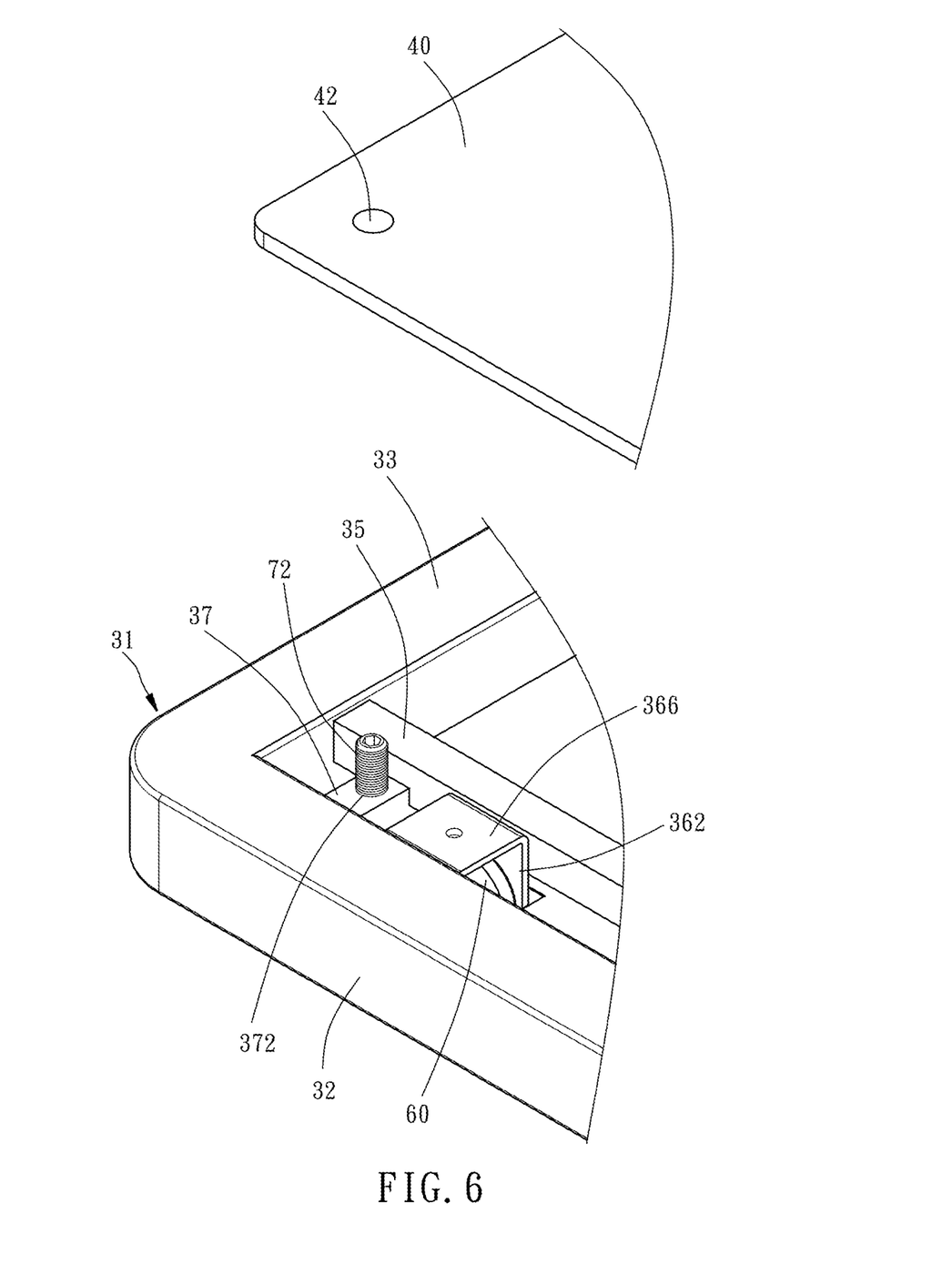
FIG. 6 is a partial exploded view of FIG. 5.
Figure 8:
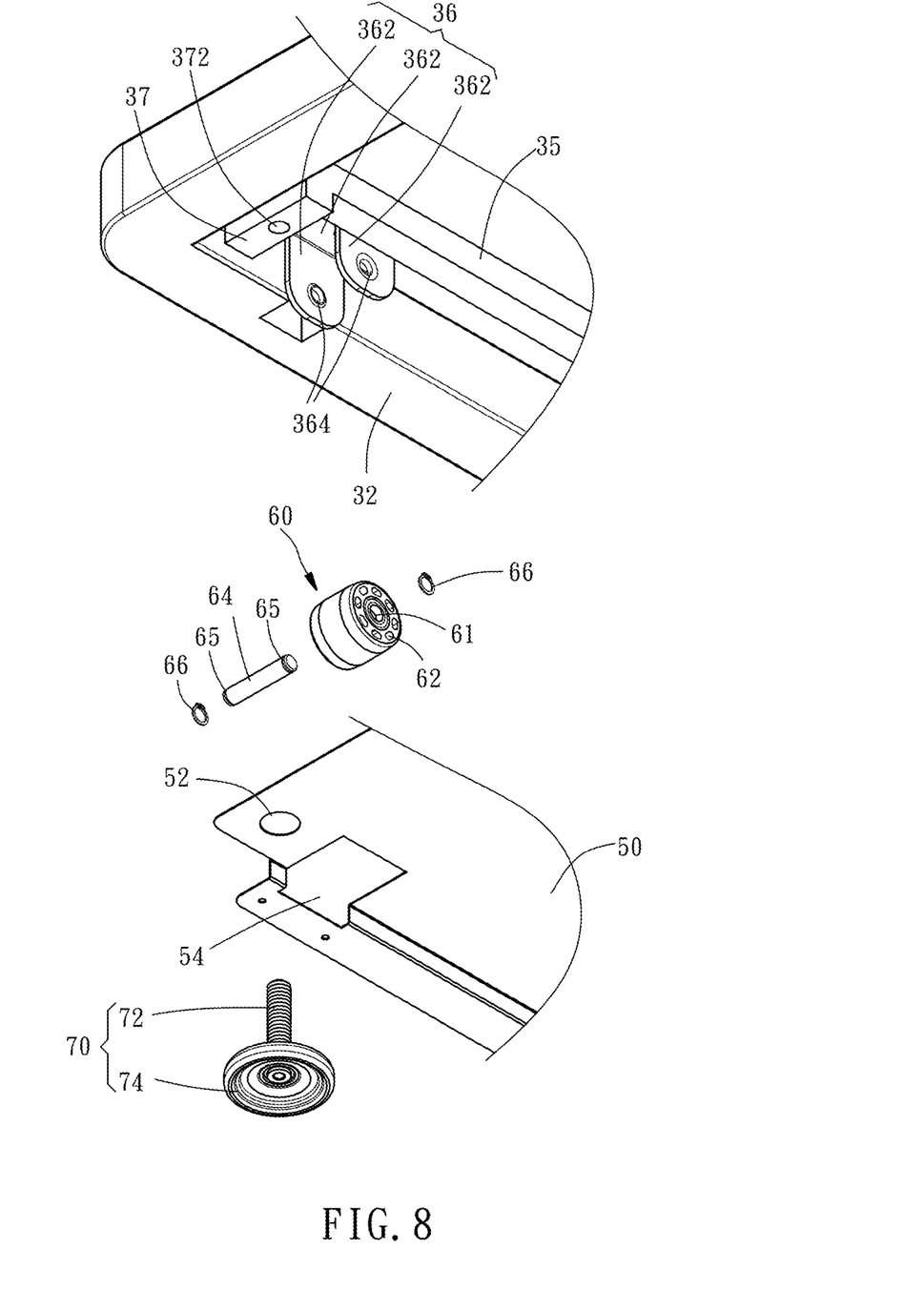
FIG. 8 is a partial exploded view of FIG. 7.

As shown in FIGS. 4 and 6, the base 20 includes a support frame 30 integrally formed as a one-piece structure and provided with a frame body 31, a first rib portion 34, four second rib portions 35, four caster supporting portions 36, and four pad supporting portions 37. The frame body 31 has a quadrilateral shape with two opposite first frame strips 32 and two opposite second frame strips 33. Two ends of the first rib portion 34 are connected with the inner surfaces of the first frame strips 32, and two ends of each of the second rib portions 35 are connected with the inner surfaces of the second frame strips 33. Further, the second rib portions 35 are vertically connected with the first rib portion 34 and arranged in an equally spaced manner along the extending direction of the first rib portion 34. The caster supporting portions 36 are located in the four corners of the frame body 31, and each have two lateral walls 362 and a top wall 366 connected between the two lateral walls 362, as shown in FIG. 8. The two lateral walls 362 each have a shaft hole 364, and the outer surfaces of the two lateral walls 362 are respectively connected with the first frame strip 32 and the second rib portion 35 closest to the first frame strip 32. The pad supporting portions 37 are located in the four corners of the frame body 31 and respectively connected between the first frame strip 32 and the second rib portion 35 closest to the first frame strip 32, as shown in FIG. 8. The pad supporting portions 37 each have a threaded hole 372 passing through the top and bottom surfaces thereof.

Further, the base 20 has a quadrilateral top plate 40 and a quadrilateral bottom plate 50. The top plate 40 is located above the support frame 30 and fixedly connected with the top surface of the frame body 31. The bottom plate 50 is located under the support frame 30 and screwed to the bottom surface of the frame body 31. As shown in FIGS. 6 and 8, the four corners of the top plate 40 each have a top hole 42, and the four corners of the bottom plate 50 each have a bottom hole 52 and an opening 54.

Figure 7:
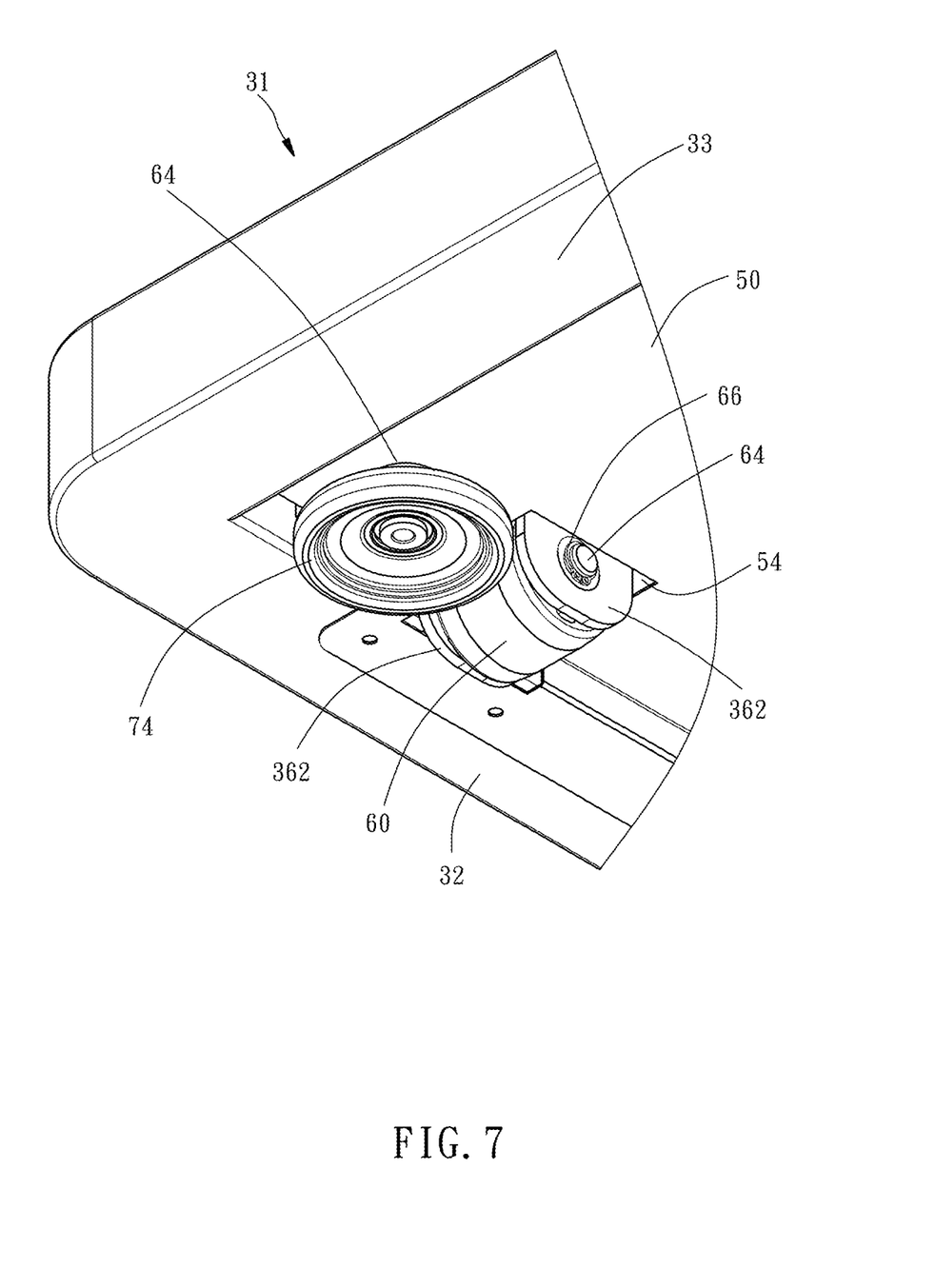
FIG. 7 is a partial enlarged view of FIG. 3.

As shown in FIGS. 7 and 8, each of the casters 60 is located between the two lateral walls 362 of one respective caster support portion 36 of the support frame 30. The casters 60 each have a center hole 61 rotatably sleeved on a shaft 64. Two ends of the shaft 64 are respectively inserted into the two shaft holes 364 and each have an annular groove 65. The shaft 64 can be prevented from being disengaged from one respective caster supporting portion 36 by fastening two retaining rings 66 to the two annular grooves 65 of the shaft 64, thereby completing the assembly of the caster 60. By this way, the casters 60 are exposed out of the bottom of the base 20 and partially received in the openings 54 of the bottom plate 50. As shown FIG. 8, the casters 60 each have a plurality of through holes 62 passing through two opposite end surfaces thereof and arranged in an equally spaced manner around the center hole 61, such that the casters 60 each have a cushion effect.

Figure 5:
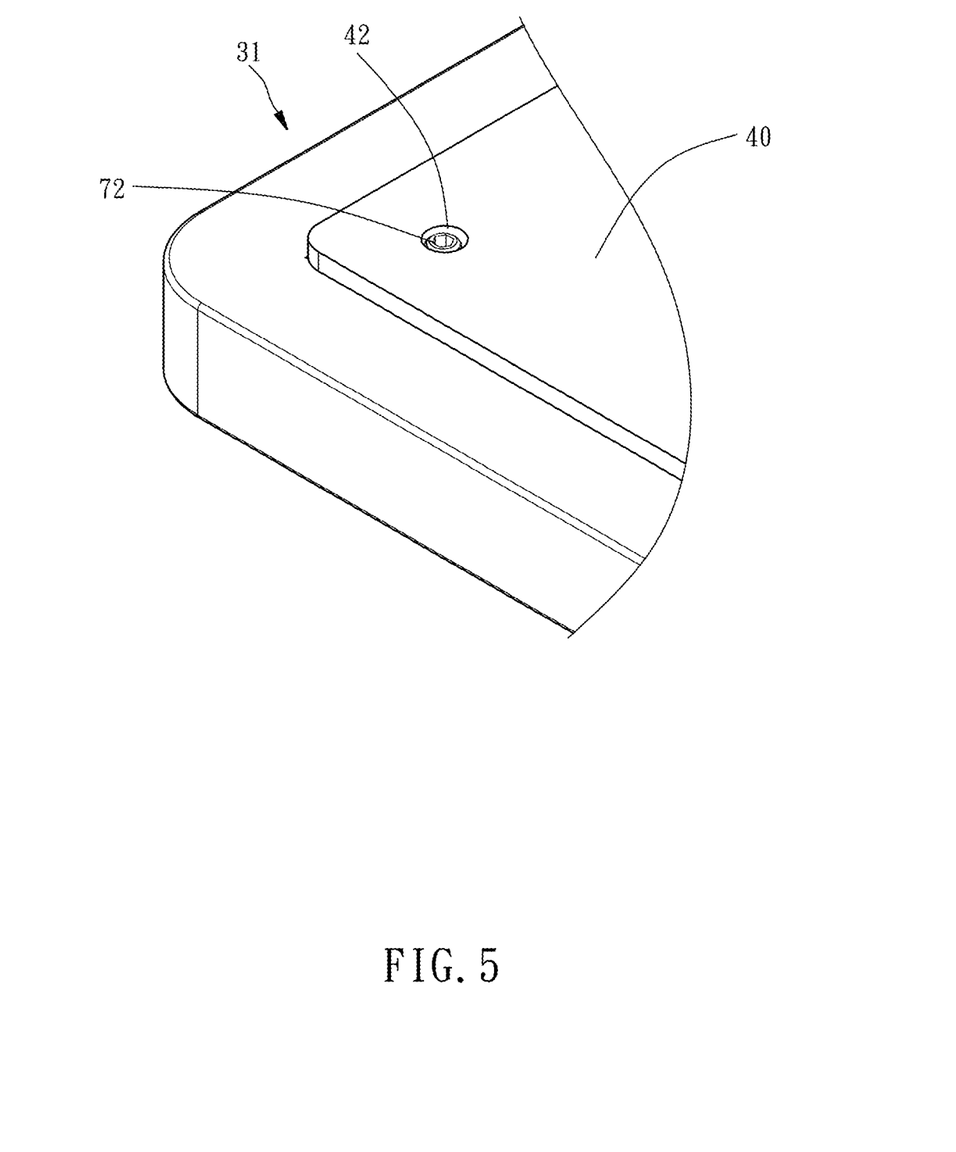
FIG. 5 is a partial enlarged view of FIG. 2.

As shown in FIGS. 7 and 8, each of the foot pads 70 has a screw 72 and a pad body 74 connected with the bottom end of the screw 72. The screw 72 of each of the foot pads 70 passes through one respective bottom hole 52 of the bottom plate 50 from bottom to top and is screwed to one respective threaded hole 372 of the pad supporting portion 37 of the support frame 30. Further, as shown in FIGS. 5 and 6, the top end of each of the screws 72 is inserted into one respective top hole 42 of the top plate 40 from bottom to top.

Figure 9:
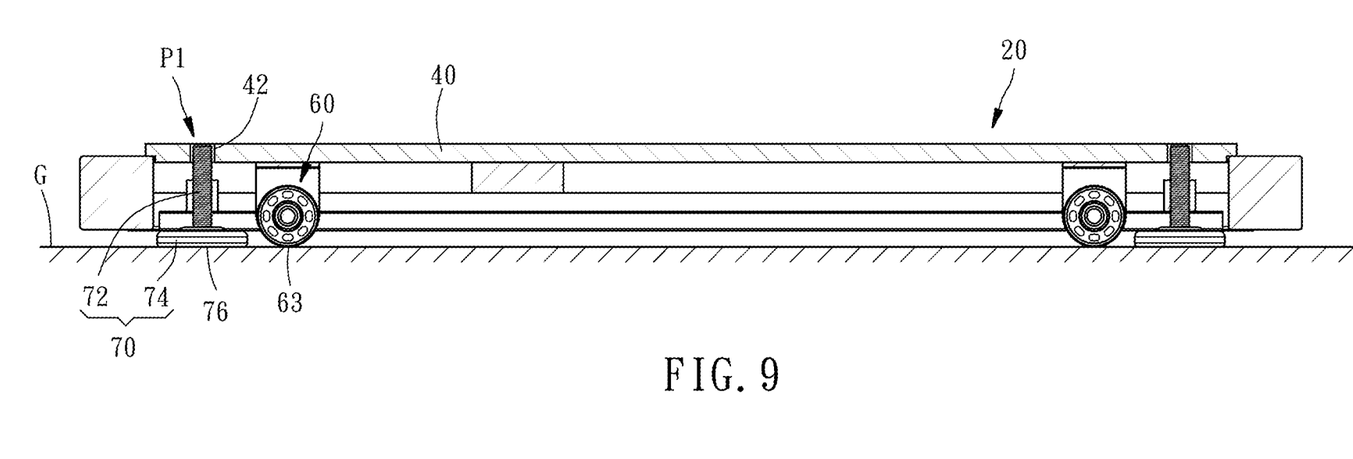
FIG. 9 is a cross-sectional view of a part of the bearing device of the present invention, showing that the foot pads are located at the first position.

It can be known from the above description that a user can drive the foot pads 70 to move upwards and downwards relative to the base 20 by turning the screws 72 from the top holes 42 with a hand tool (such as a screwdriver). When the foot pads 70 are located at a first position P1 as shown in FIG. 9, the top ends of the screws 72 are not protruded from the top holes 42 and the bottom surfaces 76 of the pad bodies 74 each have a height not higher than the bottom edges 63 of the casters 60, such that the bearing device 10 is supported on the ground G by means of the foot pads 70. By this way, the bearing device 10 cannot be moved. However, as shown in FIG. 9, the bottom surfaces 76 of the pad bodies 74 and the bottom edges 63 of the casters 60 are flushed with each other, but in fact, the bottom surfaces 76 of the pad bodies 74 can be adjusted to a height lower than the bottom edges 63 of the casters 60.

Figure 10:
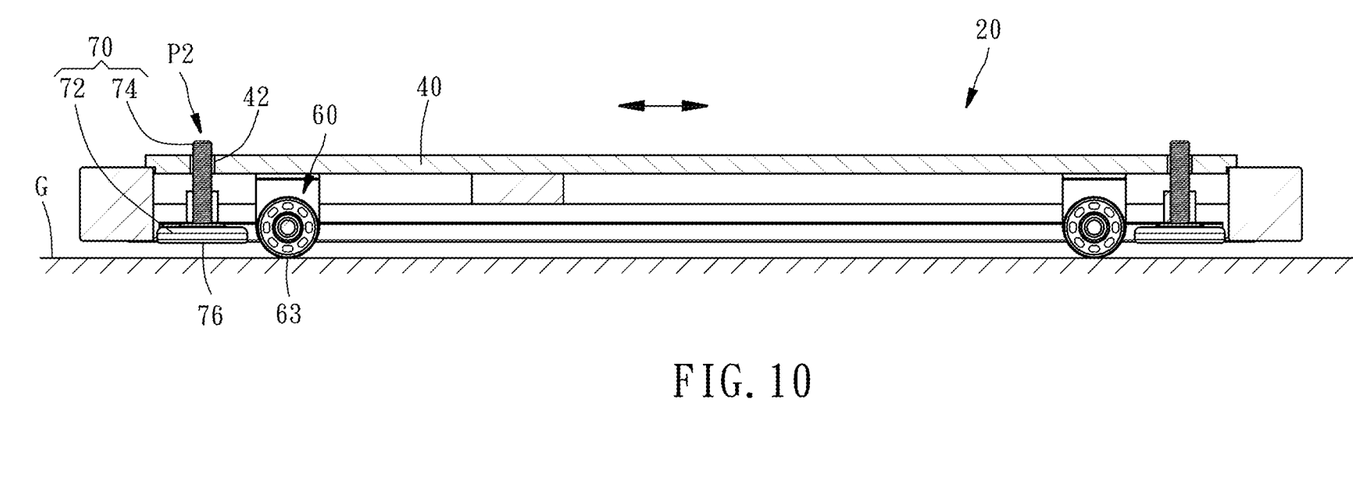
FIG. 10 is similar to FIG. 9, but showing that the foot pads are located at the second position.

When the foot pads 70 are moved upwards to a second position P2 as shown in FIG. 10, the top ends of the screws 72 are protruded from the top holes 42 and the bottom surfaces 76 of the pad bodies 74 each have a height higher than the bottom edges 63 of the casters 60, such that the casters 60 touch the ground G. By this way, the bearing device 10 can be moved by means of the casters 60 only in a straight line.

That is to say, the bearing device 10 of the present invention can be adjusted to two different usage modes according to actual needs. When the foot pads 70 are operated to the second position P2 as shown in FIG. 10, the hearing device 10 can be moved to facilitate the handling work. When the foot pads 70 are operated to the first position P1 as shown in FIG. 9, the hearing device 10 is supported on the ground G and unable to be moved. Therefore, the bearing device 10 of the present invention provides considerable freedom of use and flexibility in use.

What is claimed is:

1. A movable bearing device comprising:
   a base;
   a plurality of casters attached to a bottom of the base and protruded from the bottom of the base; and
   a plurality of foot pads movably connected to the bottom of the base and movable relative to the base between a first position where bottom surfaces of the foot pads each have a height not higher than bottom edges of the casters, and a second position where the bottom surfaces of the foot pads each have a height higher than the bottom edges of the casters;
   wherein the base includes a support frame having a plurality of threaded holes, and a top plate disposed on a top surface of the support frame and having a plurality of top holes; each of the foot pads includes a pad body and a screw having a top end thereof inserted into one respective top hole and a bottom end thereof connected with one respective pad body; the screws of the casters are respectively screwed to the threaded holes such that the foot pads are movable relative to the base between the first position where the top ends of the screws are not protruded from the top holes and the bottom surfaces of the pad bodies each have a height not higher than the bottom edges of the casters, and the second position where the top ends of the screws are protruded from the top holes and the bottom surfaces of the pad bodies each have a height higher than the bottom edges of the casters.

2. The movable bearing device as claimed in claim 1, wherein the base includes a bottom plate mounted to a bottom surface of the support frame and provided with a plurality of bottom holes and a plurality of openings; the screw of each of the foot pads passes through one respective bottom hole; a part of each of the casters is received in one respective opening.

3. The movable bearing device as claimed in claim 1, wherein the support frame includes a frame body, a plurality of rib portions connected with an inner periphery of the frame body, a plurality of caster supporting portions fixedly connected between the inner periphery of the frame body and one of the rib portions, and a plurality of pad supporting portions; each of the casters is attached to one respective caster supporting portion; each of the threaded holes is formed in one respective pad supporting portion.

4. The movable bearing device as claimed in claim 3, wherein the caster supporting portions each have two lateral walls; each of the casters is rotatably sleeved on a shaft provided with two ends thereof inserted into two shaft holes of the two lateral walls of one respective caster supporting portion; two retaining rings are respectively fastened to two annular grooves each formed in one of the two ends of the shaft.

5. The movable bearing device as claimed in claim 1, wherein the casters each have a plurality of through holes passing through two opposite end surfaces thereof and arranged in an equally spaced manner around a center thereof.

6. The movable bearing device as claimed in claim 1, wherein the casters are moved only in a straight line.

* * * * *